Patented July 9, 1929.

1,720,135

UNITED STATES PATENT OFFICE.

ARTHUR MILLS, OF CHICAGO, ILLINOIS.

PAINT.

No Drawing. Application filed May 5, 1927. Serial No. 189,182.

My invention relates to an improvement in paint, and especially in that variety of paint which is known in the trade as plastic paint. The objects of my invention are to make a plastic paint which is water-proof and, therefore, washable, which can be put on to a wall in one operation, thereby saving labor and expense, which can be tinted in various colors so as to produce various kinds of wall finishes, and which is fire-proof.

My paint is compounded as follows:

|  | Per cent by weight. |
|---|---|
| Lithopone | 65 |
| Plaster of Paris | 18 |
| Powdered mica | 7 |
| Silica | 7 |
| Portland cement | 3 |

To seventy parts of the above mixture add thirty parts of the following mixture:

|  | Per cent by weight. |
|---|---|
| Linseed oil | 41 |
| Mineral spirit | 55 |
| Dryer | 3 |
| Moisture | 1 |

Mineral spirit includes naphtha, benzine, deodorized gasoline and deodorized kesosene. Any good dryer may be used. The moisture referred to is the moisture normally contained in the above ingredients. All of the ingredients are ground together in a paint mill, forming a thick paste which may be applied to plaster, wood, iron, cement, or any surface that can be painted. The mixture is ready to apply immediately and dries in about twenty-four hours. It may be applied with a brush, sponge or sponge wheel, depending on the type of surface desired, and is suitable for producing Caen stone, floral, sponge stipple, Moorish or Spanish texture. It fills the cracks and covers blemishes in old or new walls. It may be tinted to any required color, or glazed or decorated without further preparation.

One great advantage of my invention is that when dry my paint is water-proof. It is, therefore, especially suitable as a finish for walls in dwellings and in office buildings for when it becomes soiled and dingy it can be scrubbed and cleaned without injuring the texture. A further advantage is that my paint is fire-proof.

While I have illustrated and described the preferred manner of compounding my invention, this is capable of variation and modification without departing from the spirit of the invention. I, therefore, do not wish to be limited to the precise details of composition set forth, but desire to avail myself of such variations and modifications as come within the scope of the appended claims.

Having thus described my invention what I claim as new and wish to secure by Letters Patent is:

1. Plastic paint composed of seventy parts by weight of the following mixture:

|  | Per cent by weight. |
|---|---|
| Lithopone | 65 |
| Powdered mica | 7 |
| Silica | 7 |
| Portland cement | 3 |
| Plaster of Paris | 18 | combined with thirty parts by weight of the following mixture:

|  | Per cent by weight. |
|---|---|
| Linseed oil | 41 |
| Mineral spirit | 55 |
| Dryer | 3 |
| Moisture | 1 |

2. Plastic paint composed of lithopone, plaster of Paris, powdered mica, silica and Portland cement, mixed with a vehicle composed of linseed oil, mineral spirits, and a dryer in the proportion of thirty parts by weight of the vehicle to seventy parts by weight of the other ingredients, substantially as described.

In testimony whereof I have signed my name to this specification.

ARTHUR MILLS.